(12) United States Patent
Hart

(10) Patent No.: US 6,353,780 B1
(45) Date of Patent: Mar. 5, 2002

(54) GRADE SPEED CONTROL AND METHOD FOR RAILWAY FREIGHT VEHICLE

(75) Inventor: James E. Hart, Trafford, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/605,614

(22) Filed: Jun. 28, 2000

Related U.S. Application Data

(60) Provisional application No. 60/141,395, filed on Jun. 29, 1999.

(51) Int. Cl.$^7$ .............................................. B60T 13/00
(52) U.S. Cl. ............................ 701/20; 701/19; 303/43; 303/15; 246/182 A; 246/182 B; 246/182 C
(58) Field of Search .............................. 701/20, 19, 51, 701/93, 96; 246/182 A, 182 B, 182 C, 182 R; 303/15, 43, 7, 3, 69

(56) References Cited

U.S. PATENT DOCUMENTS

| | | | |
|---|---|---|---|
| 3,610,707 A | 10/1971 | Kondo | 303/70 |
| 3,887,239 A | 6/1975 | Engle | 303/128 |
| 3,937,430 A | 2/1976 | Engle | 246/182 B |
| 4,066,230 A * | 1/1978 | Nohmi et al. | 246/182 B |
| 4,162,107 A | 7/1979 | Bazilevich et al. | 303/3 |
| 4,384,695 A * | 5/1983 | Nohmi et al. | 246/182 B |
| 4,852,007 A * | 7/1989 | Yasunobu et al. | 701/70 |
| 5,018,689 A * | 5/1991 | Yasunobu et al. | 246/182 B |
| 5,387,030 A | 2/1995 | Gayfer et al. | 303/30 |
| 5,393,129 A | 2/1995 | Troiani et al. | 303/3 |
| 5,746,486 A * | 5/1998 | Paul et al. | 303/146 |
| 5,785,392 A | 7/1998 | Hart | 303/7 |
| 5,833,325 A | 11/1998 | Hart | 303/7 |
| 5,927,822 A * | 7/1999 | Hart | 303/7 |
| 5,984,426 A | 11/1999 | Hart | 303/15 |

* cited by examiner

Primary Examiner—William A. Cuchlinski, Jr.
Assistant Examiner—Marthe Marc-Coleman
(74) Attorney, Agent, or Firm—Buchanan Ingersoll, P.C.

(57) ABSTRACT

A grade speed control system and method for a railway freight vehicle can include a microprocessor receiving input from, for example, the dynamic and independent brakes on the locomotive, and the brakes on each rail car. The microprocessor can store values for desired train speed and actual train speed as well as constants and equations for converting raw data to derive brake cylinder pressure adjustments for implementing train speed control functions. The grade speed control system can also include communicate with brake cylinder control devices on articulated rail cars to increase or decrease the brake cylinder pressures to control the train speed. If actual speed differs from target speed by more than a predetermined amount, a target acceleration can be calculated and brake cylinder pressures adjustments can be derived to achieve the target acceleration to bring the actual speed of the train to the target speed in a reasonably brief time period. This sequence can be reiterated as the train progresses down the grade, automatically adjusting train braking effort as required to maintain the target speed within a tight range.

22 Claims, 4 Drawing Sheets

GRADE SPEED CONTROL AND METHOD FOR RAILWAY FREIGHT VEHICLE

CROSS REFERENCE TO RELATED APPLICATION

This application is based on U.S. Provisional Patent Application Serial No. 60/141,395, filed Jun. 29, 1999.

BACKGROUND

This invention relates generally to electronically controlled brake systems for rail vehicles, and more particularly, to an electronic grade speed control and method therefore for a rail vehicle for automatically adjusting a train brake application as required to maintain a preselected train speed.

From the inception of the early Westinghouse Air Brake, until the present time, compressed air has been the medium by which brake control signals have been transmitted through a train of railroad freight cars, as well as the force by which friction retardation is applied through brake shoes that engage the car wheel treads during braking. With the advent of electro-pneumatic (ECP) brake control systems, the capability of the air brake has been extended beyond that which could be achieved with conventional pneumatic brake control systems. The improved capabilities are due primarily to the fact that the brake control signal can be transmitted instantaneously to each car in the train, whereas propagation of a pneumatic control signal is limited to a value approaching the speed of sound.

In a freight train, a number of articulated rail cars are typically interconnected by a brake pipe which supplies pressurized fluid from a main reservoir on a locomotive. Each car normally has on-board a brake pipe, a reservoir which is charged with pressurized fluid from the main reservoir, an exhaust device and a fluid pressure activated brake cylinder device. In some cars, a pneumatic control valve may also be present in conjunction with an electronic controller of an ECP freight brake control system.

In an ECP system, the electronic controller operates solenoid actuated valves which control the access of pressurized fluid between the reservoir, the brake cylinder and the exhaust device.

The pressure in the brake pipe can be controlled from the locomotive by the train engineer. Conventionally, there are three different types of brakes controlled by the engineer on the locomotive. The first is an "independent brake" which are the brakes on the locomotive only. The second type is referred to as a "dynamic brake" and pertains to the use of the locomotive engines to provide a retardation force for the train. The third type is the "train brakes" or "friction brakes," which refers to the pneumatic brakes on each of the rail cars. With respect to the friction brakes, a reduction in the brake pipe pressure by the train engineer signals either the pneumatic control valve or the electronic controller to apply the brakes on the rail car. The level of braking force to be applied is generally a function of the amount of reduction in brake pipe pressure. Although the electronic controller can utilize pressure sensors to detect changes in the brake pipe pressure, the train engineer could also electrically transmit a command signal to the electronic controller on each rail car instructing it to apply a selected amount of braking force. Similarly, an increase in the brake pipe pressure is a signal to release the brakes on the rail car. Also, as with applying the brakes, a command signal can also be transmitted to instruct the electronic controller to release the brakes.

While pneumatic braking is used for a number of purposes in normal train operation such as to slow or stop a train or to control inter-car dynamics (slack, run-in, run-out) special consideration can be given to the operating condition when braking is used to maintain the speed of a train on a descending grade. During this condition, the friction brakes are often used to supplement the dynamic braking supplied by the locomotive in the train. When grade braking, only up to about one-half of the available full service brake cylinder pressure is typically used, as needed, to assist in balancing the gravitational grade acceleration force imparted on the train. If the total train retarding force exactly matches the grade accelerating force, acceleration is zero and velocity is held constant. If the total retarding force is greater, velocity decreases.

Freight trains can often be dozens, even hundreds, of cars long, resulting in an extremely large moving mass, which requires an equally large degree of braking force to control. Consequently, it can be difficult to maintain a constant pre-selected train speed when the train is traveling on a descending grade. Control of the speed of the train on a descending grade can be problematic, especially if the speed of the train increases beyond a safe degree or if the reservoirs become overly depleted such that control over the speed of the train is compromised.

Historically, a problem has sometimes arisen because the braking control systems typically had no provision for a graduated release of brake cylinder pressure. Only after the brake cylinder pressure had been exhausted could a new brake application be applied at a different level. Thus, to alter the level of braking after an application was initiated, the brake cylinder had to vented. Moreover, venting the brake cylinders depletes pressure in the system much more quickly than it can be replenished from the main reservoir. Consequently, applying and exhausting the brakes successive times can quickly deplete pressure reservoirs below a level capable of controlling the speed of the train. Clearly, this can be particularly undesirable on a descending grade. Thus, maintaining the speed of the train within a tight range on a descending grade is highly desirable. However, using a graduated release brake valve, it is possible to selectively increase or decrease the brake cylinder pressure any number of times without entirely exhausting the brake cylinder pressure. A graduated release brake valve is disclosed in co-pending U.S. patent application Ser. No. 09/894,053, which is hereby incorporated herein by reference.

SUMMARY

A grade speed control system for a railway freight vehicle according to the invention can be accomplished by a speed control system having a microprocessor which receives input from various sources, such as from both the dynamic brake and the independent brake on the locomotive, as well as the brake cylinder on each rail car. Additionally, values can be input to the microprocessor for the desired train speed, the actual train speed, and the constants and equations utilized to convert the raw data into the values necessary to derive the brake cylinder pressure adjustment needed to implement the speed control functions of the grade speed control system. Additionally, the grade speed control system can communicate with a brake cylinder control device, such as, for example, an electronic controller, on each rail car in order to increase or decrease the brake cylinder pressures to control the train speed.

In implementing the grade speed control, when the train begins down a descending grade, the operator will typically set the desired level of dynamic brake and then gradually apply the friction brakes as required to generally balance the gravitational accelerating force of the grade and maintain the desired train speed. The grade speed control may then be activated by setting a switch and inputting the desired train speed to the brake control microprocessor on the locomotive. The microprocessor can monitor actual train speed, calculate the acceleration, and compare actual speed to target speed. If the actual speed differs from the target speed by more than a predetermined amount, a target acceleration is calculated. From the target acceleration, a brake cylinder pressure adjustment can be derived to achieve the target acceleration and bring the actual speed of the train to the target speed in a reasonably brief period of time. This sequence can be reiterated as the train progresses down the grade, automatically adjusting train braking effort as required to maintain the target speed within a tight range.

A new target speed may be designated at any time, and the grade speed control system can automatically adjust train speed to match the new target speed. Similarly, the dynamic brake setting may be changed, and the brake control microprocessor can automatically compensate with an appropriate adjustment to the brake cylinder pressures. Additionally, if either train speed or brake cylinder pressure approaches an excessive level, the operator can be promptly warned by the system.

The grade speed control system can also vary the level of brake cylinder pressure adjustment based on the magnitude of the difference between the target speed and the actual speed. For example, where the difference between the actual speed and target speed is greater than a predetermined amount, a higher value can be utilized in the equations from which brake cylinder pressure adjustment is derived in order to implement a critical speed control adjustment. Similarly, if the magnitude of the difference between the actual speed and the target speed is sufficiently small, a lower value can be used in the brakes cylinder pressure adjustment equations to implement a normal speed control adjustment. Moreover, to avoid overshooting the target speed, the brake cylinder pressure adjustments can be modified as the actual speed approaches the target speed. The prevailing acceleration, as controlled by the existing brake cylinder pressure, can preferably be derived from successive velocity measurements. The change in brake cylinder pressure can then be predicated on the difference between the prevailing train acceleration and the target acceleration. By reiteratively carrying out this process, the brake cylinder pressure can be automatically and continuously controlled to maintain the speed of the train within a tight range.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
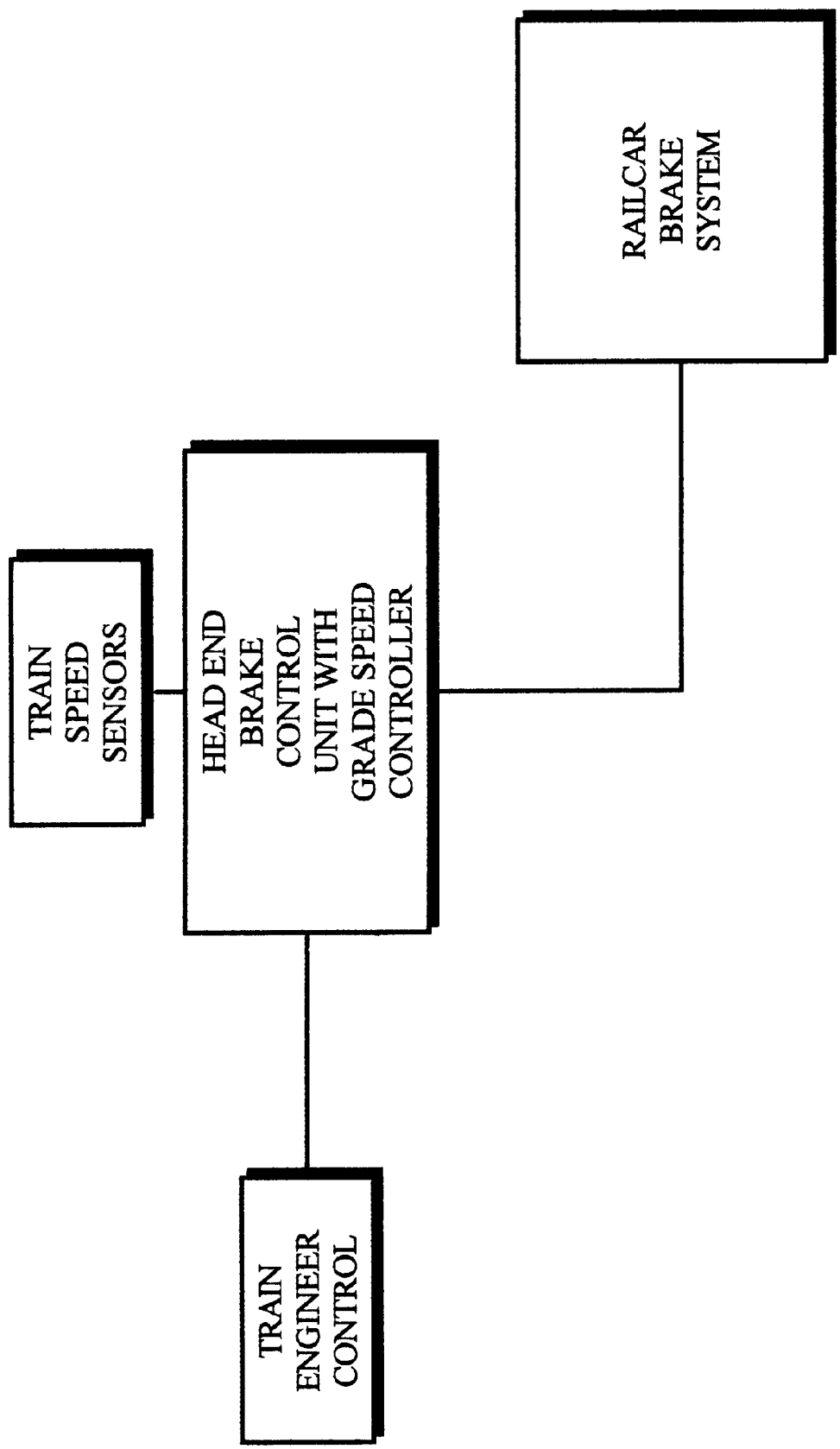
FIG. 1 is a schematic generally showing a presently preferred embodiment of a grade speed control system according to the invention.

Referring now to the drawing figures, a presently preferred grade speed control freight brake system is shown, generally, in schematic form in FIG. 1. The system can include train engineer controls for operating the locomotive dynamic brake, independent brake, and friction brake. The operation of those brakes can be input to a grade speed controller which also receives input form various train speed sensors. The grade speed controller can communicate with the brake system on articulated rail cars in order to control those brake systems to implement the grade speed control for the train.

Figure 2:
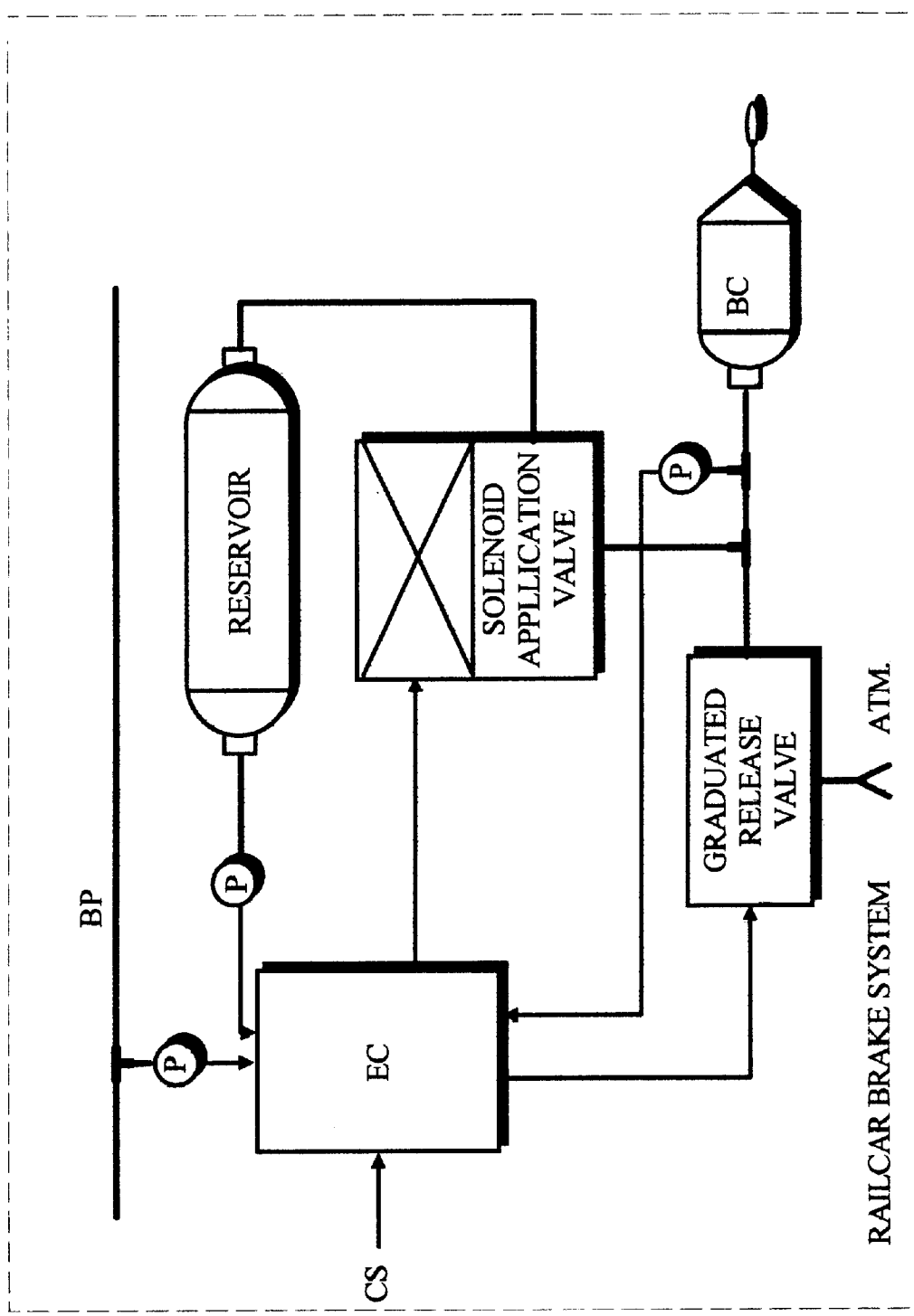
FIG. 2 is a schematic showing in more detail the rail car brake system shown in FIG. 1.

The brake system on articulated rail cars can typically include the components shown in FIG. 2, such as an electronic controller (EC) which communicates with the grade speed controller via electrical or radio frequency command signals CS. The EC can also receive input from pressure sensors monitoring the prevailing pressure in, for example, the brake pipe (BP), a pressurized air reservoir, and the brake cylinder. The EC can control the pressure in the brake cylinder via an electropneumatic valve and a graduated release valve. The EC can cause the electropneumatic valve to couple the brake cylinder to the reservoir to increase brake cylinder pressure responsive to such command from the grade speed controller. Alternatively, the EC can cause the graduated release valve to incrementally reduce brake cylinder pressure, similarly in response to such command signal from the grade speed controller.

In addition, if for some reason a command signal from the grade speed controller fails to be receiver, the EC can also operate responsive to pneumatic brake signals communicated via the brake pipe. In such cases, the EC can utilized the brake pipe pressure sensor to detect pneumatically transmitted brake command signals in the conventional manner.

Brake Cylinder Pressure Adjustment for Grade Speed Control

Figure 3A:
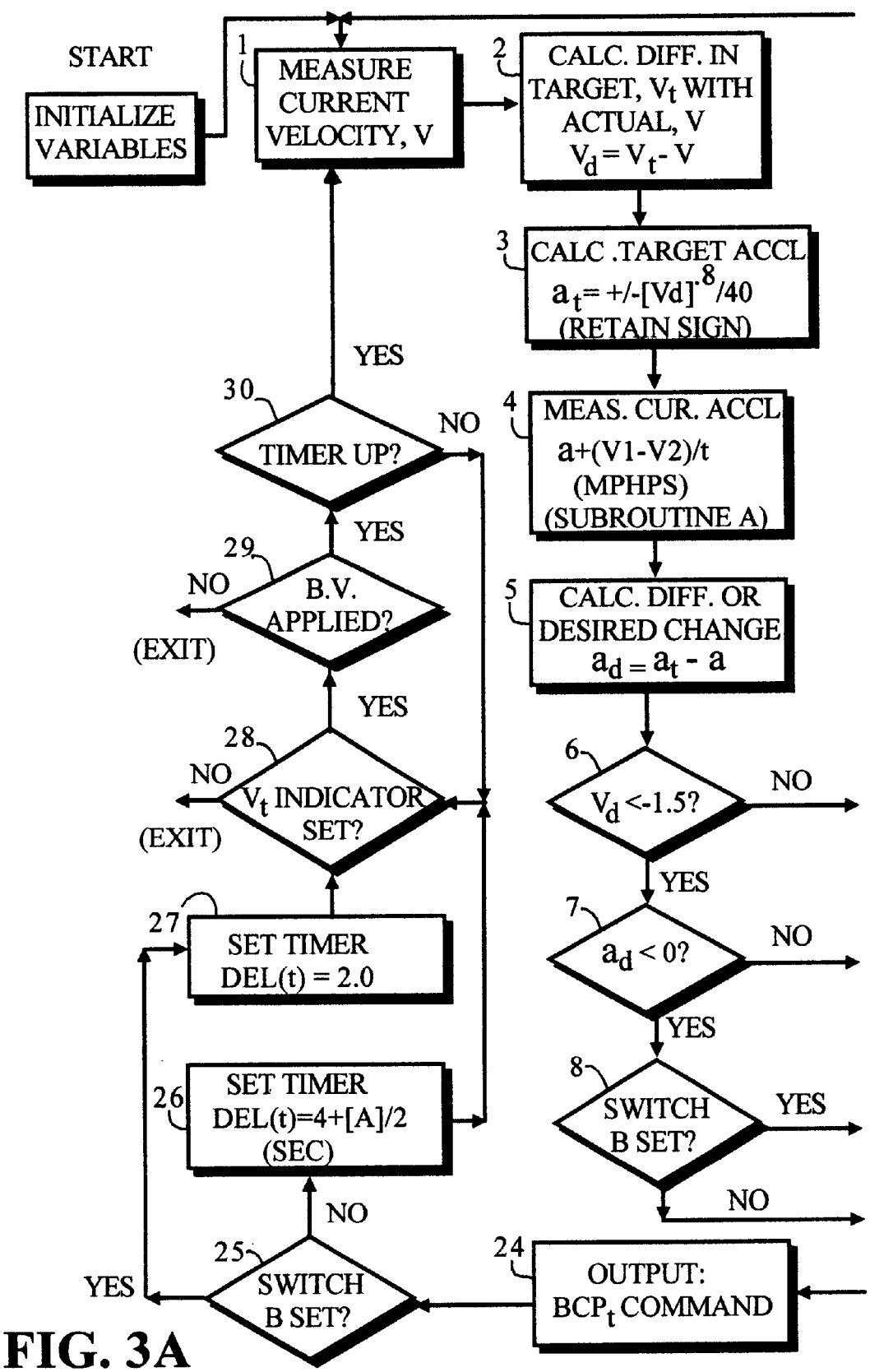
FIG. 3 is a flow chart of a presently preferred method of implementing a grade speed control system according to the present invention.
Figure 3B:
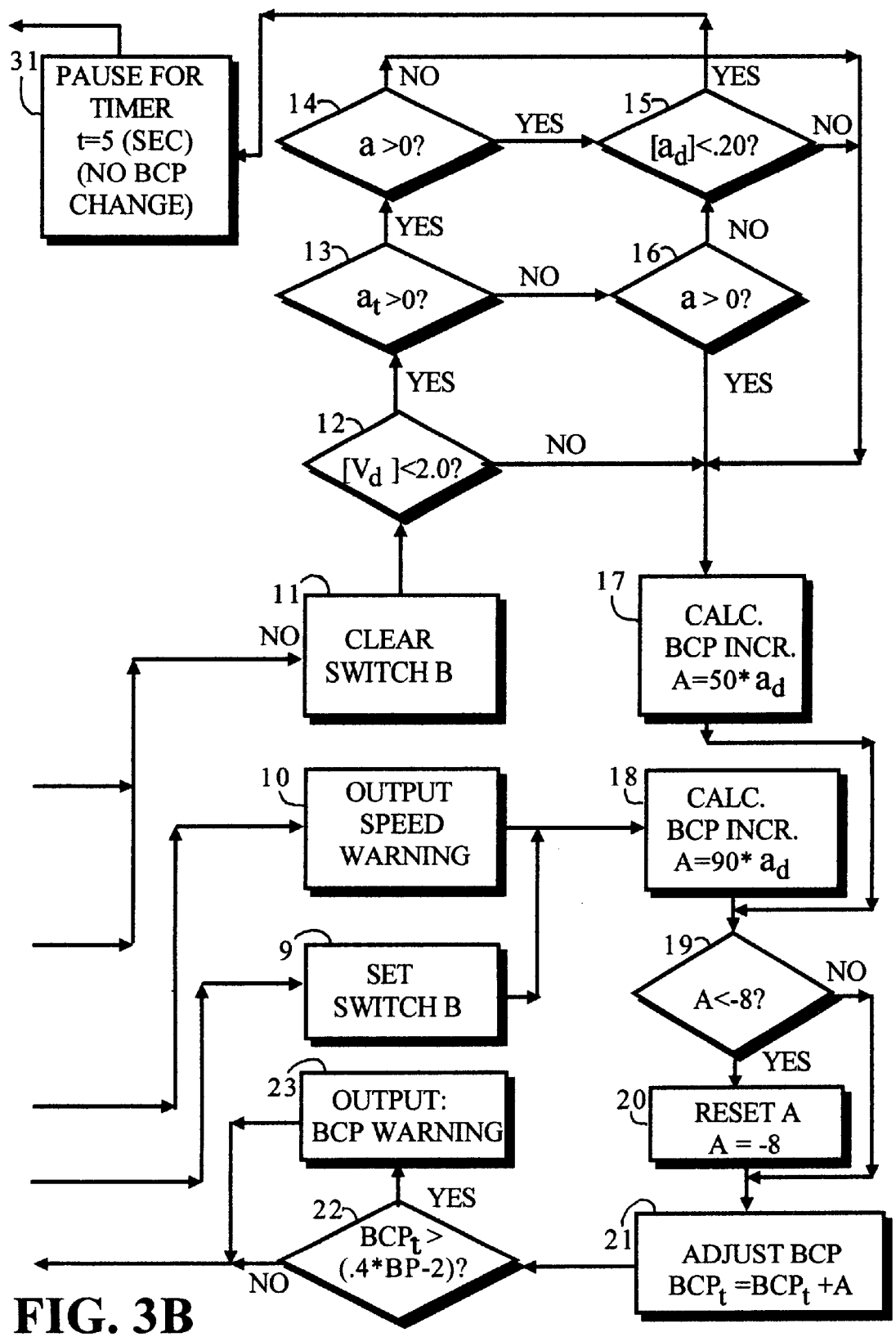

A typical algorithm to achieve automatic train BCP adjustment to maintain a constant train speed is presented in FIG. 3. The brake cylinder pressure adjustment from any existing brake cylinder pressure is derived to achieve a target acceleration, as needed to bring the train speed to the target speed in a reasonably brief time. To avoid overshooting, these pressure adjustments are moderated as the speed approaches the target speed. The prevailing acceleration, as controlled by the existing brake cylinder pressure, is derived from successive velocity measurements. The change in BCP is then predicated on the difference between the current train acceleration and the target acceleration.

Target Acceleration

Target acceleration is a calculated value representing the rate of change of train speed needed to bring the velocity to the desired velocity in a reasonably short time. The equation for target acceleration, $a_t$, may be, for example, as follows:

$$a_t = \frac{\pm |V_d| 8}{40.0}$$

where $V_d = V_t - V$ (difference between target velocity and actual velocity) (The sign of $V_d$ is retained for $a_t$.)

As shown, the target acceleration is based on the existing difference between the desired velocity and the current velocity. This equation provides the values listed in the following table.

| Brake Cylinder Pressure Adjustment | | |
| --- | --- | --- |
| $V_d$ | $a_t$ | Time to reach $V_d = 0$ if $a_t$ is sustained |
| Speed too high | | |
| −10.0 mph | −.1577 mphps | 63.4 sec |
| −5.0 | −.0906 | 55.2 |
| −2.0 | −.0435 | 46.0 |
| −1.5 | −.0346 | 43.4 |
| −1.0 | −.0250 | 40.0 |
| 0 | 0 | 0 |
| Speed too low | | |
| +1.0 | +.0250 | 40.0 |
| +1.5 | +.0346 | 43.4 |
| +2.0 | +.0435 | 45.95 |
| +5.0 | +.0906 | 55.2 |
| +10.0 | +.1577 | 63.4 |

The brake cylinder pressure adjustment from any existing pressure is derived, as described, to achieve the target acceleration for the train. The derivation is as follows:

$$F = ma \text{ and } a = F/m \quad (1)$$

where F is brake retarding force and m=mass of a car $$\therefore a = \frac{F * 32.175}{w} \quad (2)$$

$$F = NSF * \mu = NBR_t * W * \mu \quad (3)$$

where $\mu$=coefficient of brake shoe friction
Using a nominal of friction value $\mu=0.32$ $$\text{Substituting } a = \frac{NBR_t * W * \mu * 32.175}{W} \quad (4)$$

$$a = 10.3 * NBR_t \quad (5)$$

Because $NBR_t$ represents 50 psi BCP, $$a = 10.3 * NBR_{t/50} = 0.206 * NBR_t \text{(per psi BCP)} \quad (6)$$

Changing a in fpsps to mphps, $$a = 0.1404 * NBR_t \text{(per psi BCP, in mphps)} \quad (7)$$

$$\text{To achieve 1 mphps a requires } 7.1225/NBR_t \text{(psi BCP)} \quad (8)$$

For a 263,000 lb. car having a design net braking ratio= $NBR_t$, a change of BCP equal to $7.1225/NBR_t$ psi will change acceleration by 1 mphps.
Therefore:

$$A = \Delta BCP = \frac{7.1225 * a_t}{NBR_t} \quad (9)$$

For cars loaded to less than 263,000 lbs., ΔBCP will be proportionally lower. Using a nominal NBR of 8%, or 0.08, values of 90.0 and 50.0 can be used in place of $7.1225/NBR_t$ in the BCP adjustment equation, for critical speed control and normal changes, respectively.

Explanation of Algorithm (Flowchart)

The algorithm for reiteratively adjusting train brake cylinder pressure to maintain a selected speed can generally be defined by the flowchart shown in FIG. 3. When the grade speed control system is activated, all variables are initialized and the designated speed is registered. Then the program loop is followed to closely control train speed.

Brake cylinder pressure adjustments are reiteratively calculated in a timed loop. The adjustment cycle time is somewhat variable, based partly on the amount of braking adjustment made during the current cycle. This provides sufficient time for any adjustments to become effective, unless a dangerous speed situation begins to develop. If that occurs, a minimum cycle time of, for example, 2 seconds is imposed.

During each program cycle, the amount of any brake cylinder pressure adjustment made to correct train speed depends on a number of factors. In a logical order, the program compares actual train speed to the command target speed and the actual acceleration to a calculated target acceleration. It is not sufficient to base BCP adjustments on speed differences alone, because the train may already be accelerating or decelerating as needed to correct speed. The most serious cases are when train speed exceeds target speed by a substantial amount or when it exceeds target speed and the train is accelerating. Also, if the speed difference is substantial, but the current train acceleration or deceleration exceeds the calculated target, it may not be necessary to adjust BCP on the current loop.

To trace the algorithm in more detail, the numbers below correspond to the numbered steps in the flow chart.

1. Measure current velocity.
2. Calculate difference between target and actual speed, vd. Note:
   If vd is (+), velocity is <target velocity and must be allowed to increase.
   if vd is (−), velocity is >target velocity and must be reduced.
3. Calculate target acceleration, at, to correct velocity at=f(vd) with the same sign. Note:
   If at is (+), velocity must increase (accelerate).
   If at is (−), velocity must be reduced (decelerate).
4. Measure actual acceleration, a, by successive normalized velocity readings. Note:
   If a is (+), train is accelerating.
   If a is (−), train is decelerating.
5. Calculate difference between actual and target acceleration.

ad=at−a Note:

If ad is (+), train must increase deceleration or decrease acceleration. (BCP may need to be increased.)
   If ad is (−), train must increase acceleration or decrease deceleration. (BCP may need to be decreased.)
6. Is actual velocity more than 1.5 mph higher than target velocity? (This determines whether a moderate or substantial BCP adjustment may be needed.) (If yes, substantial, go to 7. If no, moderate, go to 11.)
7. Is acceleration difference, ad, negative? (If so, higher BCP may be needed.) (If yes, go to 8. If no, go to 1.)
8. Is switch B set? (This delays speed warning to operator for one loop.) (If yes, go to 9 to set it. If no, go to 10.)
9. Set switch B. (Go to 18.)
10. Output speed warning. (Go to 18.)
11. Clear switch B. (Go to 12.)
12. Is difference between target and actual velocity, vd, less than 2 mph? (If yes, go to 13. If no, go to 17.)

13. Is target acceleration, at, positive (need to increase speed)? (If yes, go to 14. If no, go to 16.)
14. Is actual acceleration, a, positive (train speed increasing)? (If yes, go to 15. If no, go to 17.)
15. Is difference between target and actual acceleration, ad, less than 2 mphps? (Steps 13-14-15, or 13-16-15, may determine that train speed is increasing or decreasing as needed and within 0.2 mphps of target acceleration, in which case no BCP adjustment is necessary.) (If yes, go to 31. If no, go to 17.)
16. Is actual acceleration, a, positive (train speed increasing)? (If yes, go to 17. If no, go to 15.)
17. Calculate moderate BCP adjustment.

$$A=50*ad$$

(Go to 19.)
18. Calculate BCP adjustment:

$$A=90*ad$$

(Go to 19.)
19. Is BCP adjustment less than −8 psi? (This is to limit fast reduction of BCP that may overshoot.) (If yes, go to 20. If no, go to 21.)
20. Re-set adjustment to 8. Go to 21.
21. Calculate new BCP requirement. Go to 22.
22. Does BCP exceed ½ of full service BCP, or (0.4BP-2)? (This is to caution operator if so.) (If yes, go to 23. If no, go to 24.)
23. Output BCP caution.
24. Output new BCP command. Go to 25.
25. Is switch B set? (This is to shorten loop timer if train speed is critical.) (If yes, go to 27. If no, go to 26.)
26. Set loop timer as function of amount of BCP adjustment made. Go to 28.
27. Set loop timer to 2 seconds.
28. Is speed control indicator set? (If yes, go to 29 to continue. If no, exit and maintain existing brake command.)
29. Is train brake applied? (Coordinate with brake control handle position.) (If yes, go to 30 to continue. If no, advise operator of speed control exit and monitor normally for brake commands.)
30. Is loop timer up? (If yes, go to 1 to start another loop. If no, go to 28.)
31. Pause for timer: t=5 sec. (No BCP change. Go to 1.)

Target Acceleration, Etc.

| Vd | At | Projected Fix Time | BCP Chg. |
|---|---|---|---|
| 0.5 | 0.014 | 34.8 | 0.72 |
| 1 | 0.025 | 40.0 | 1.25 |
| 1.5 | 0.035 | 43.4 | 3.11 |
| 2 | 0.044 | 45.9 | 3.92 |
| 3 | 0.060 | 49.8 | 5.42 |
| 5 | 0.091 | 55.2 | 8.15 |
| 8 | 0.132 | 60.6 | 11.88 |
| 12 | 0.183 | 65.8 | 16.43 |

Where:
Vd=Difference between actual and target velocity.
At=Target acceleration to correct velocity difference.
Fix Time=Projected time to get to target velocity at target acceleration.
BCP Chg.=Change in BCP to change acceleration from 0 to target. (Algorithm accounts for current acceleration.) Note:
(At 8% NBR, a=approx. 0.01227 mphps per psi BCP.)
(At 24% NBR a=0.046 mphps per psi, requiring mult. factor of 21.73 in BCP equation, instead of 65.185. A7 6.5% NBR, Mult. Factor=80.23.)

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:
1. A grade speed control method for a railway freight train having a locomotive and at least one unpowered articulated rail car having an electro-pneumatic (ECP) brake control system including a fluid pressure activated brake cylinder device and a graduated release valve, the method comprising:
   a. selecting a target train velocity for negotiating a down grade;
   b. monitoring actual train velocity on said down grade;
   c. detecting a velocity difference between the target velocity and the actual velocity; and
   d. adjusting brake cylinder pressure to vary friction retardation on said at least one unpowered articulated rail car responsive to said velocity difference to cause the actual velocity to generally correspond to the target velocity.
2. The method of claim 1 further comprising reiteratively carrying out steps c through d.
3. The method of claim 2 further comprising:
   a. selecting a new target velocity; and
   b. adjusting the brake cylinder pressure to cause the actual velocity to generally correspond to the new target velocity.
4. The method of claim 1 wherein said adjusting brake cylinder pressure is responsive to a velocity difference exceeding a predetermined minimum velocity difference.
5. A grade speed control method for a railway freight train having a locomotive and at least one articulated rail car having an ECP brake control system including a fluid pressure activated brake cylinder device and a graduated release valve, the method comprising:
   a. monitoring actual train velocity;
   b. selecting a target train velocity;
   c. detecting a velocity difference between the target velocity and the actual velocity;
   d. calculating a prevailing acceleration of the train;
   e. calculating a target acceleration;
   f. deriving a brake cylinder pressure adjustment to achieve the target acceleration; and
   g. implementing said brake cylinder adjustment to cause the prevailing acceleration to generally correspond to the target acceleration to bring the actual velocity to the target velocity.

6. A grade speed control method for a railway freight train having a locomotive and at least one articulated rail car having an electro-pneumatic (ECP) brake control system including a fluid pressure activated brake cylinder device and a graduated release valve, the method comprising:

a. monitoring actual train velocity;
   b. selecting a target train velocity;
   c. detecting a velocity difference between the target velocity and the actual velocity;
   d. adjusting brake cylinder pressure on said at least one articulated rail car responsive to said velocity difference to cause the actual velocity to generally correspond to the target velocity;
   e. determining whether the velocity difference exceeds a predetermined amount;
   f. determining whether the prevailing acceleration is positive or negative;
   g. deriving a first brake cylinder pressure adjustment based upon a higher level of desired braking force;
   h. deriving a second brake cylinder pressure adjustment based upon a lower level of desired braking force;
   i. implementing said first brake cylinder pressure adjustment responsive to at least one of the velocity difference exceeding the predetermined amount and the prevailing acceleration being positive; and
   j. implementing said second brake cylinder pressure adjustment responsive to at least one of the velocity difference being less than the predetermined amount and the prevailing acceleration being negative.

7. The method of claim 6 further comprising providing a speed warning responsive to at least one of the velocity difference exceeding the predetermined amount and the prevailing acceleration being positive.

8. The method of claim 6 further comprising reiteratively calculating said prevailing acceleration over a shorter time interval responsive to implementing said first brake cylinder pressure adjustment.

9. The method of claim 6 further comprising reiteratively calculating said prevailing acceleration over a time interval calculated as a function of said second brake cylinder pressure adjustment.

10. A grade speed control method for a railway freight train having a locomotive and at least one articulated rail car having an electro-pneumatic (ECP) brake control system including a fluid pressure activated brake cylinder device and a graduated release valve, the method comprising:

a. monitoring actual train velocity;
   b. selecting a target train velocity;
   c. detecting a velocity difference between the target velocity and the actual velocity;
   d. adjusting brake cylinder pressure on said at least one articulated rail car responsive to said velocity difference to cause the actual velocity to generally correspond to the target velocity;
   e. detecting whether a brake cylinder pressure adjustment would result in a brake cylinder pressure exceeding one-half of a full service brake cylinder pressure; and
   f. providing a warning responsive to said detecting a brate cylinder pressure exceeding one-half of a full service brake cylinder pressure.

11. A grade speed control method for a railway freight train having a locomotive and at least one articulated rail car having an electro-pneumatic (ECP) brake control system including a fluid pressure activated brake cylinder device and a graduated release valve, the method comprising:

a. monitoring actual train velocity;
   b. selecting a target train velocity;
   c. detecting a velocity difference between the target velocity and the actual velocity;
   d. adjusting brake cylinder pressure on said at least one articulated rail car responsive to said velocity difference to cause the actual velocity to generally correspond to the target velocity;
   e. detecting whether a brake cylinder pressure adjustment would result in a reduction of brake cylinder pressure by more than a predetermined amount; and
   f. substituting a predetermined maximum brake cylinder pressure reduction responsive to said detecting a reduction of brake cylinder pressure by more than a predetermined amount.

12. A grade speed control method for a railway freight train having a locomotive, multiple unpowered rail cars, an electropneumatic brake control system having graduated brake capability and including fluid pressure activated brake cylinders on each of said multiple unpowered rail cars, the method comprising:

a. selecting a target train velocity for negotiating a down grade;
   b. monitoring actual train velocity on said down grade;
   c. detecting a velocity difference between the target velocity and the actual velocity; and
   d. adjusting brake cylinder pressure to vary friction retardation on said multiple unpowered rail cars responsive to said velocity difference to cause the actual velocity to generally correspond to the target velocity.

13. The method of claim 12 further comprising:

a. detecting whether a brake cylinder pressure adjustment would result in a brake cylinder pressure exceeding a predetermined brake cylinder pressure; and
   b. providing a warning responsive to said detecting.

14. An apparatus on a railway freight train for controlling the speed of the train on a down grade, said freight train having a locomotive, multiple unpowered rail cars, an electropneumatic brake control system having graduated brake capability and including fluid pressure activated brake cylinders on each of said multiple unpowered rail cars, the apparatus comprising:

a. train engineer controls for selecting and inputting a target train velocity for negotiating a down grade;
   b. train speed sensors to monitor actual train velocity on said down grade;
   c. a grade speed controller receiving input from said train engineer controls and said train speed sensors, said grade speed controller operatively associated with said electropneumatic brake control system on said multiple unpowered rail cars for controlling pressure in said fluid pressure activated brake cylinders;
   d. said grade speed controller comparing said target velocity and said actual velocity to detect a velocity difference therebetween; and
   e. said grade speed controller adjusting brake cylinder pressure to vary friction retardation on said multiple unpowered rail cars responsive to detecting a velocity difference to cause said actual velocity to generally correspond to said target velocity.

15. The apparatus of claim 14 further comprising:

a. said grade speed controller calculating a prevailing acceleration of the train based upon reiterative velocity readings;

b. said grade speed controller calculating a target acceleration based upon said velocity difference;

c. said grade speed controller deriving a brake cylinder pressure adjustment to achieve said target acceleration; and d. said grade speed controller implementing said brake cylinder adjustment to cause said prevailing acceleration to generally correspond to said target acceleration to bring the actual velocity to the target velocity.

16. The apparatus of claim 14 wherein said grade speed controller adjusts brake cylinder pressure is responsive to said velocity difference exceeding a predetermined minimum velocity difference.

17. The apparatus of claim 14 further comprising said grade speed controller:

a. determining whether the velocity difference exceeds a predetermined amount;

b. determining whether the prevailing acceleration is positive or negative;

c. deriving a first brake cylinder pressure adjustment based upon a higher level of desired braking force;

d. deriving a second brake cylinder pressure adjustment based upon a lower level of desired braking force;

e. implementing said first brake cylinder pressure adjustment responsive to at least one of the velocity difference exceeding the predetermined amount and the prevailing acceleration being positive; and f. implementing said second brake cylinder pressure adjustment responsive to at least one of the velocity difference being less than the predetermined amount and the prevailing acceleration being negative.

18. The apparatus of claim 17 further comprising said grade speed controller providing a speed warning responsive to at least one of the velocity difference exceeding the predetermined amount and the prevailing acceleration being positive.

19. The apparatus of claim 17 further comprising said grade speed controller reiteratively calculating said prevailing acceleration over a shorter time interval responsive to implementing said first brake cylinder pressure adjustment.

20. The apparatus of claim 17 further comprising said grade speed controller reiteratively calculating said prevailing acceleration over a time interval calculated as a function of said second brake cylinder pressure adjustment.

21. The apparatus of claim 17 further comprising said grade speed controller:

a. detecting whether a brake cylinder pressure adjustment would result in a brake cylinder pressure exceeding a predetermined brake cylinder pressure; and b. providing a warning responsive to said detecting.

22. The apparatus of claim 17 further comprising said grade speed controller:

a. detecting whether a brake cylinder pressure adjustment would result in a reduction of brake cylinder pressure by more than a predetermined amount; and b. substituting a predetermined maximum brake cylinder pressure reduction responsive to said detecting.

* * * * *

UNITED STATES PATENT AND TRADEMARK OFFICE
CERTIFICATE OF CORRECTION

PATENT NO. : 6,353,780 B1  Page 1 of 1
DATED : March 5, 2002
INVENTOR(S) : James E. Hart It is certified that error appears in the above-identified patent and that said Letters Patent is hereby corrected as shown below:

Column 9,
Line 60, change "brate" to -- brake --.

Signed and Sealed this

Fourth Day of June, 2002

Attest:

Attesting Officer

JAMES E. ROGAN
Director of the United States Patent and Trademark Office